United States Patent Office 3,416,763
Patented Dec. 17, 1968

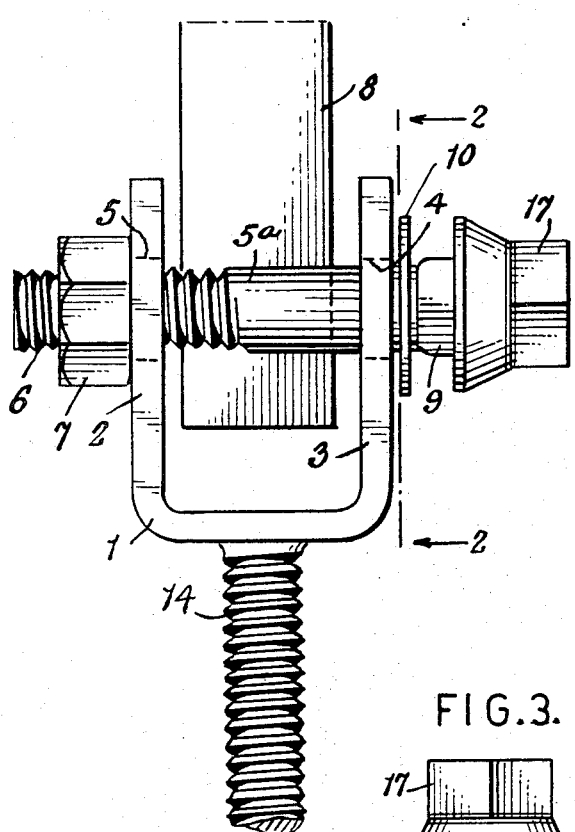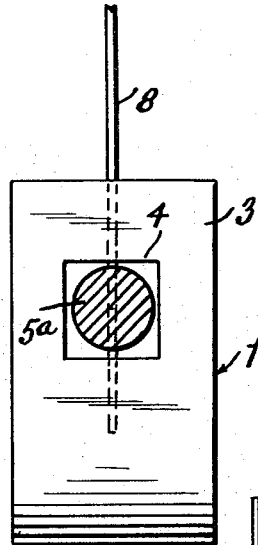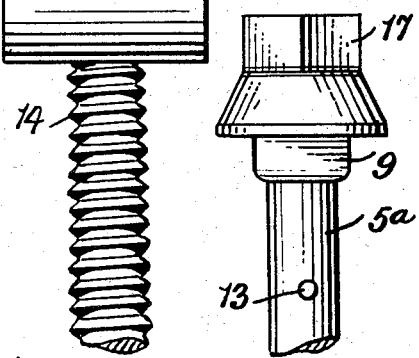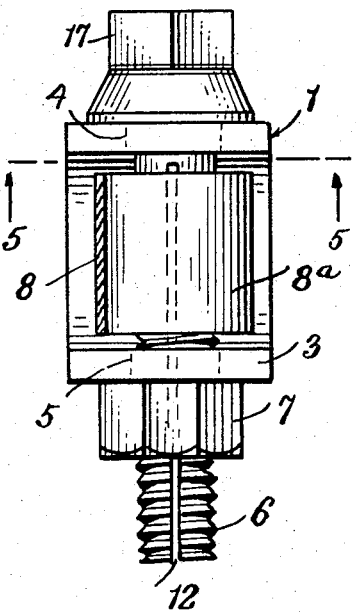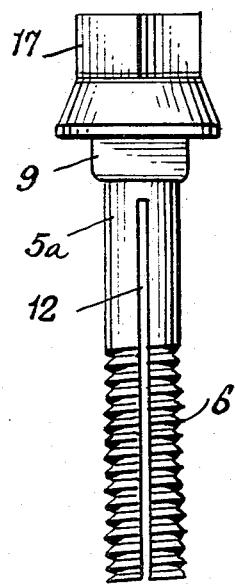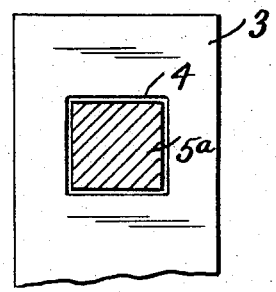
INVENTOR.
Albert M. Moreno though the device is shown as having a rectangular frame or yoke, the frame may be of any other suitable shape.

3,416,763
DEVICE FOR TENSIONING STRAPS, WIRES, OR LIKE FLEXIBLE ELEMENTS
Albert M. Moreno, 2601 Sea Island Drive, Fort Lauderdale, Fla. 33301
Filed Apr. 24, 1967, Ser. No. 632,977
5 Claims. (Cl. 248—361)

ABSTRACT OF THE DISCLOSURE

The device consists of a substantially U-shaped frame or yoke having means for attaching it to a support; the frame including a pair of legs in which a take-up bolt is rotatably mounted and is axially adjustable. The bolt is apertured to receive the end of the strap or wire to be tensioned and by the rotation of the bolt by the use of a suitable tool such as a wrench, the strap or wire is wound around the bolt and to an extent to place the strap or wire under the desired tension. Thereupon the bolt is shifted axially in the legs of the frame by the adjustment of a nut on it, to bring a non-round or square portion of the bolt into a complementarily-shaped opening in one of the legs of the frame, thereby holding the bolt against rotation and preventing the unwinding of the strap or wire from it.

---

This invention relates to improvements in tensioning devices for straps, belts, wires and similar flexible elements and has for its primary object the provision of a simple and effective device for this purpose. The elements to be tensioned may be belts or straps employed for holding down machinery, mobile homes and many other things, or the wires, straps etc. might be those used in fences, for bracing antennas, frames and other structures.

The device comprises a yoke-shaped member having a threaded part for attaching it to a base or support. One of the legs of the yoke has a round hole through it; the second leg has a square hole through it. A bolt is extended through both holes and the bolt has a head at one end of a square part which is located near the head. At the opposite end of the bolt is a nut. The bolt has a slot through it to receive the end of a belt or strap. With the bolt loose in the holes in the legs of the yoke, the bolt can be rotated to wind the belt or strap around it. A fracturable washer on the bolt holds the square part of the bolt out of the square opening during the turning of the bolt. When the belt or strap is wound up to the required extent, the nut is tightened, the washer fractured by the tightening, the bolt moved axially to bring the square part of the same into the square hole, thus holding the bolt against rotation and maintaining the belt or strap in the wound-up position around the bolt.

In the accompanying drawing, wherein an illustrative embodiment of the invention is shown, FIG. 1 is a front elevational view of a tensioning device constructed according to the invention;

FIG. 2 is a sectional view, taken substantially on the line 2—2 of FIG. 1, looking in the direction of the arrows;

FIG. 3 is a top plan view of the device;

FIG. 4 is an elevational view of the bolt;

FIG. 5 is a sectional view, taken substantially on the line 5—5 of FIG. 3, looking in the direction of the arrows; and FIG. 6 is a view of the head end of the bolt, taken at right angles to the view of FIG. 4.

Referring to the drawing, 1 indicates generally the frame or yoke of the tensioning device. The same is provided with spaced legs indicated respectively at 2 and 3. The legs are each provided with an opening, one of which is shown at 5 and the other at 4, the opening shown at 4 being non-round or square in shape.

At 5a is shown a bolt which extends through and is mounted for rotative movement in the openings 4 and 5 and is also axially adjustable through said openings. One end portion of the bolt is threaded, as shown at 6, and this part of the bolt threadably receives a nut 7 that is located on the outside of the leg 2 of the frame or yoke 1. The opposite end of the bolt 5a is provided with a hexagonal or other suitably shaped head 17 capable of receiving a wrench, such as one of the ratchet type, for rotating the bolt to wind up a strap 8 or a wire or other flexible element upon it to thus tension the strap or wire.

Behind the head of the bolt is provided a non-round or square portion 9 integrally formed on the bolt and of a size enabling it to fit within the complementary or square-shaped opening 4 in the leg 3 of the frame. Normally, the square portion 9 of the bolt is maintained out of the opening 4 by means of a washer 10 fitted around the bolt forwardly of the square portion 9 thereof. This washer may be composed of relatively thin and easily fractured material so that when the bolt is axially adjusted through the openings in the legs of the frame, the washer will become distorted or fractured and will thus permit the square portion 9 of the bolt to enter the square opening 4 in the frame.

The bolt is perforated by being split axially from one end as shown at 12 in FIG. 4 so that the end of the strap 8 can be inserted in the slot thus provided. As an alternative, the bolt can be provided with a round hole 13, as shown in FIG. 6, such hole receiving a wire when the device is to be used for tensioning a wire or other slender flexible element.

From the foregoing, the operation of the tensioning device will be apparent. The frame 1 is provided with a threaded shank 14 by means of which it can be mounted in or on a suitable base or support located adjacent to the point of location of the strap or wire to be tensioned. The end of the strap or wire 8 is inserted through the slot 12 or the hole 13 in the bolt 5a, and while the parts of the device are in the positions shown in FIG. 1, the head 17 of the bolt is engaged by a suitable tool such as a ratchet wrench, and the bolt is rotated to cause the strap or wire to be wound around it until the required tension is obtained on the strap or wire. While the wind-up of the strap or wire is taking place, the washer 10 prevents the entry of the square portion 9 of the bolt into the square opening 4 so that rotative movement of the bolt within the frame 1 is not impeded. When the strap or wire has been tensioned by the rotation of the bolt as above described, the nut 7 is then threadably adjusted along the bolt which draws the bolt axially to an extent to bring the square portion thereof into the square opening 4.

As the square portion 9 of the bolt moves toward the square opening 4 it encounters the washer 10 and either so distorts the washer or else fractures it so that the washer thereupon no longer prevents the entry of the square part 9 of the bolt into the opening 4. When the square part 9 of the bolt enters the opening 4 the bolt can no longer be rotated and so the same will be held against rotative unwinding of the strap. FIG. 3 shows a part 8a of the strap wound around the bolt and the parts of the bolt disposed in the locked position attained by the entry of the square portion 9 of the bolt into the complementary square opening 4 in the leg of the frame 1.

When desired, the strap or wire can be loosened or removed from the device by loosening the nut 7 and shifting the bolt axially.

When the bolt is thus shifted axially, the square part 9 will be moved out of the opening 4 and the bolt can be rotated to unwind the portion of the strap or wire that is on it.

Having thus described a single embodiment of the invention, it is obvious that the same is not to be restricted thereto, but is broad enough to cover all structures coming within the scope of the appended claims.

What I claim is:

1. A tensioning device for straps, belts, wires and the like comprising, a substantially U-shaped frame having a projecting threaded anchoring stem, the frame including a pair of spaced, substantially parallel legs, each leg having an opening, the openings being in axial alignment in a direction transversely of the frame, a bolt extending through the openings and having parts at its opposite ends respectively projecting beyond the legs, one of the parts having a head including a square portion, the other part being threaded, the threaded part receiving a nut, the opening in the leg located adjacent to the head being square to receive the square portion of the head when the bolt is axially adjusted through the legs by the threadable adjustment of the nuts on the bolt, the bolt being rotatable in the openings when the square portion of the head is located out of the square opening, and the bolt being held against rotation when the square portion thereof is disposed in said square opening, and the bolt being apertured to receive the end portion of a strap, belt or wire.

2. A device for tensioning a belt, wire or a like flexible element comprising, a yoke having spaced legs, a bolt extending between the legs and rotatably mounted therein, a head on one end of the bolt beyond one of the legs, a nut threadably adjustable on the opposite end of the bolt beyond a second leg, the bolt having a non-round part, one of the legs having a non-round opening complementary to the non-round part of the bolt, the bolt being rotatable without lateral displacement in said openings in the yoke while the non-round part of it is disposed out of the non-round opening and while said non-round part of the bolt is projecting on the outside of the leg in which the non-round opening is formed, and the bolt will be held against rotation while the non-round part of it is disposed in the non-round opening, means fitted on the bolt between the non-round part and one of the legs for preventing entry of the non-round part into the non-round opening in said leg during the wind-up of the belt on the bolt, said means being rendered inoperative by the longitudinal adjustment of the bolt through the openings, and the bolt having an aperture in it through which the belt can be passed to cause the belt to become wound around the bolt when the bolt is rotated.

3. A tensioning device according to claim 2, wherein the means for preventing the entry of the non-round part of the bolt into the non-round opening is a frangible washer arranged on the bolt between the non-round part of it and the non-round opening, said washer being destructible or distortable by the adjustment of the nut on the bolt so that the washer will be able, upon its destruction or distortion, to enable the non-round part of the bolt to enter the non-round opening.

4. A tensioning device for a strap or wire comprising, a frame in which a rotatable bolt is mounted, the bolt being slotted to receive the end of a strap or wire to be tensioned, means by which the bolt is rotatable as well as axially adjustable in the frame, means carried by the bolt adjacent to the non-round part thereof for maintaining the bolt against axial movement while it is being rotated to wind the strap or wire upon it, said means being rendered inoperative by axial adjustment of the bolt in the frame, interengaging means on the bolt and frame for holding the bolt against rotative movement after the strap or wire is tensioned by the winding of a part of it on the bolt, and means adjustable on the bolt for causing interengagement of said interengaging means to thereby hold the bolt against rotation.

5. A tensioning device according to claim 4, wherein the interengaging means is a square part formed on the bolt and a square opening in the frame to receive said part of the bolt, the adjustable means on the bolt being a nut threadably adjustable thereon at a point beyond the frame, a frangible washer encircling the bolt between the square portion thereof and the frame, said washer normally serving to prevent the entry of the square portion of the bolt into the square opening.

References Cited

UNITED STATES PATENTS

| | | | |
|---|---|---|---|
| 551,504 | 12/1895 | Leonard | 248—61 |
| 870,944 | 11/1907 | Fish | 211—119.15 |
| 1,282,848 | 10/1918 | Jones | 24—269 |
| 1,467,860 | 9/1923 | Lampert | 24—269 |
| 1,745,279 | 1/1930 | Skinner | 24—269 |

JOHN PETO, *Primary Examiner.*

U.S. Cl. X.R.

254—161; 211—119.15; 24—71.2